United States Patent [19]

Morgan et al.

[11] Patent Number: 4,567,514
[45] Date of Patent: Jan. 28, 1986

[54] CAMERA CARRYING CONDUIT INSPECTION SLED

[75] Inventors: William C. Morgan; Richard A. Wagner, Sr., both of Amherst, N.Y.

[73] Assignee: Wag-Mor Corporation, Amherst, N.Y.

[21] Appl. No.: 583,700

[22] Filed: Feb. 27, 1984

[51] Int. Cl.[4] .............................................. H04N 7/18
[52] U.S. Cl. .................................. 358/100; 73/40.5 R
[58] Field of Search .......................... 73/40.5 R, 432 G; 104/138 G; 138/90, 97; 280/12 M, 15, 20; 358/100

[56] References Cited

U.S. PATENT DOCUMENTS

| 3,784,740 | 1/1974 | Copland | 358/100 X |
| 3,794,340 | 2/1974 | Tartabini et al. | 280/15 |
| 3,832,724 | 8/1974 | Duval | 358/100 X |
| 4,168,621 | 9/1979 | Kreitenberg | 73/40.5 R |
| 4,194,218 | 3/1980 | Hasegawa | 358/100 |

FOREIGN PATENT DOCUMENTS

| 1104201 | 11/1955 | France | 104/138 G |
| 0131878 | 9/1983 | Japan | 358/100 |

OTHER PUBLICATIONS

Cherne Industrial, Inc., Technical Bulletin #31-9000, "It Doesn't Cost Much to Look", 1972.

Primary Examiner—Charles Hart
Attorney, Agent, or Firm—Robert C. Weber

[57] ABSTRACT

A conduit inspection sled comprises: a cage including longitudinally spaced adjustable collars for removably clamping a camera therein and a plurality of peripherally spaced and outwardly extending, elongated upper and lower struts connecting the collars on the upper and lower sides thereof; supports including elongated runners arranged on the lower side of the cage and elongated skids mounted on the upper struts; cables connected to opposite ends of the sled for transporting the same forwardly and rearwardly along the conduit; fore and aft links pivotally connecting the front and rear ends respectively of each lower strut and runner for relative movement toward and away from each other into retracted and extended sled positions respectively; inclined tension springs connecting the cage with the runners beyond the front end of the cage, and normally biasing the cage and runners into an extended sled position, wherein the runners slidably contact the inner periphery of the conduit and thereby normally center the camera substantially along the central longitudinal axis of the conduit; the springs also permitting such relative movement into a retracted sled position wherein the sled is allowed to clear an obstacle within the conduit; an adjustable stop on each runner and removably engageable with a stop retainer on each lower strut for limiting such relative movement to more than one extended sled position depending upon the interior size of the conduit; and an adjustable latch on each strut for ensuring positive engagement with a keeper on the trailing edge of each aft link for locking the sled in a fully retracted position obtained by pulling the rear cable and tensioning the front cable to collapse the sled into such fully retracted position, and thereby facilitate retrieval by reverse transport past an obstacle already cleared during forward transport.

8 Claims, 9 Drawing Figures

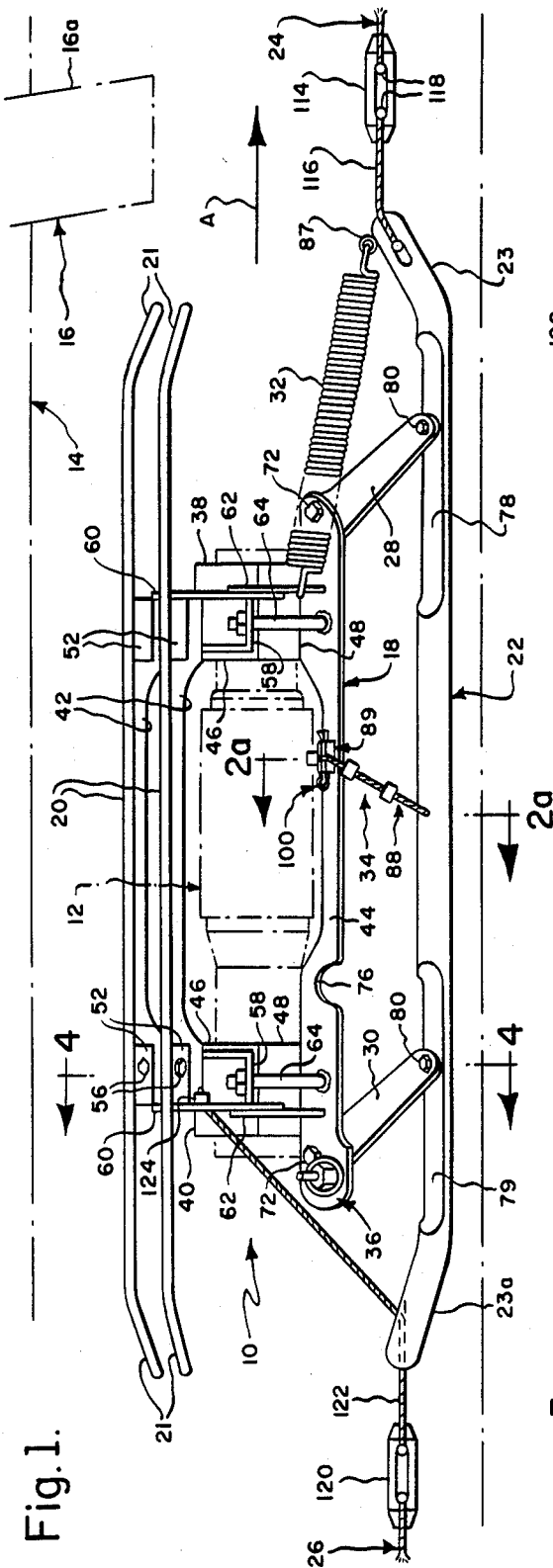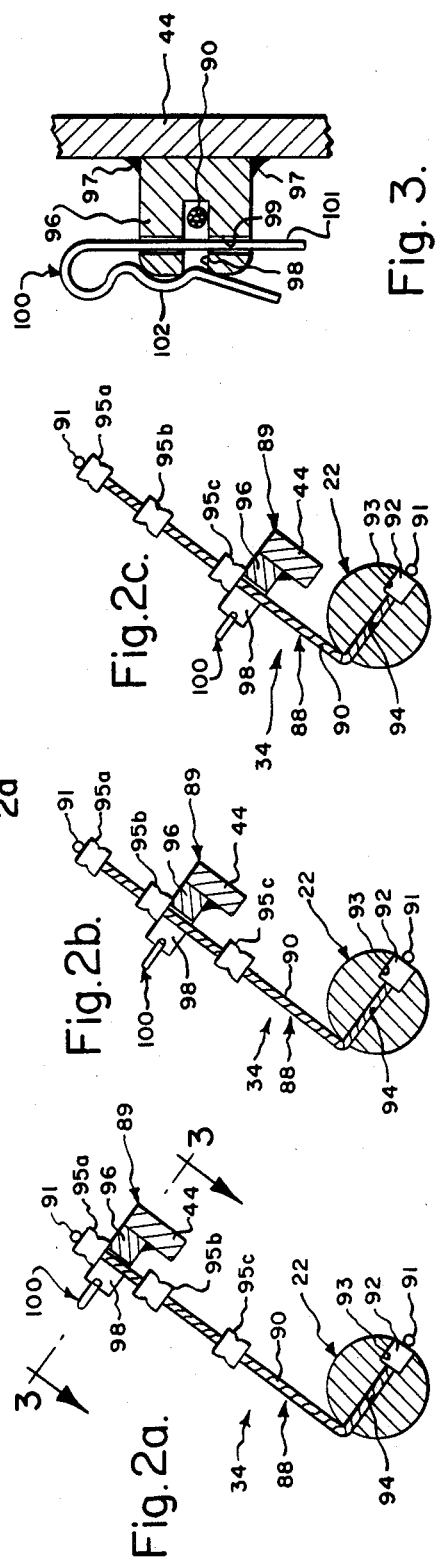

CAMERA CARRYING CONDUIT INSPECTION SLED

BACKGROUND OF THE INVENTION

1. Field of the Invention

The present invention relates to systems for inspecting conduits, such as underground sewer pipes, and more particularily to a new and improved conduit inspection sled.

2. Description of the Prior Art

It is common practice today to utilize television or photo-strip cameras or the like for inspecting the interior of various conduits, such as underground sewer lines, in order to determine the condition of the conduit, and thereby arrange for prompt repair, such as the closing of breaks or leaks. In a typical installation, a TV camera is mounted on a sled, preferably with the axis of the camera alined substantially coincident with the central longitudinal axis of the conduit for accuracy of observation, with a minimum of distortion. The sled is transported by cables between two open surface locations in the line or pipe, such as manholes, and the camera is connected via closed circuit to a monitor at the surface for instantaneous observation of the condition of the conduit section being traversed. As a matter of fact, the inspection sled may be a component of a train incorporating repair equipment located at a predetermined distance from the camera lens, so that upon proper positioning of the repair equipment, as observed by one viewing the monitor on the surface, the equipment can be actuated by remote control, in order to complete necessary repairs.

However, both the considerable range of interior sizes of such conduits, and the presence therein of various obstructions, such as broken pieces of pipes and inwardly projecting roots and/or laterals, present substantial problems to be overcome in efficiently and effectively carrying out such inspection. Usually, the camera carrying sleds are pre-adjusted at the surface to the interior size of the particular pipe to be inspected. A typical, present day example of such conduit inspection sleds is that produced and sold by Cues Inc. of Orlando, Fla. and Sacramento, Calif. under the designation "Q-TV Camera". This sled includes a single circular collar or band for carrying an elongated camera body and provided with a series of outstanding radial flanges on which are mounted three elongated skids on the upper side of the collar and two elongated runners on the under side of the collar, with cables being attached to the front and rear ends of the runners for transport fore and aft through the pipe.

As long as the pipe size remains constant and there are no obstructions therein, this device works well. However, when the pipe I.D. changes, e.g. reduces, and/or obstructions are met, such prior art sled must be backed out of the conduit and readjusted at the surface to conform to the smaller pipe size and/or to pass the obstructions. This requires removal of the flanges, skids and runners and replacement by another set of flanges in order to produce the reduced sled size required for continuing the already interrupted inspection operation. As will be evident, such removal, readjustment and replacement of the inspection sled is not only time consuming and tedious, but also inefficient and ineffective for accomplishing the desired objective of substantially continuous and accurate conduit inspection.

The same is true of the camera carrying and diametrically adjustable, sewer inspection sled disclosed in Tartabini et al., U.S. Pat. No. 3,794,340. For such adjustment, this patented device requires removal of a locking rod and both removal and replacement of pivot pins in a number of longitudinally spaced holes in the runner supporting frame members for varying the effective length of the linkage assembly.

Geskey, U.S. Pat. No. 1,498,446 discloses a sewer cleaning sled which also is diametrically adjustable, but only by removing and replacing both the annular cutter and the radial arms supporting the skids or runners. Vertut, U.S. Pat. No. 4,244,296, on the other hand, discloses a self-propelled, camera carrying vehicle especially designed for inspection of pipes within a nuclear installation in a radioactive atmosphere. As illustrated in the patent, the vehicle includes at least one, electric motor driven propelling wheel, and at least one pair of telescopic arms, each arm being pivoted into contact with the interior pipe wall by a torque transmitting device said to be a rotary jack (not shown) for the embodiments of FIGS. 3a and 3b, or an electric motor for the embodiment of FIG. 3c, or a spring (not shown) for the embodiment of FIG. 4. While this patented device is automatically adjustable within a pipe, it is not really a sled at all, but rather a substantially more complex, sophisticated and expensive, self-propelled vehicle especially adapted for use under the extremely hazardous radioactive conditions encountered when inspecting nuclear installation conduits. Accordingly, it would not be as feasible, as a practical matter, to utilize such a prohibitively expensive apparatus for ordinary conduit inspection purposes.

Likewise of interest is the drive unit, for otherwise unspecified internal pipe line equipment, as taught by Rhoden, U.S. Pat. No. 4,177,734. However, this patent also is directed to a self-propelled vehicle, wherein the hydraulic or pneumatic drive motor is mounted parallel to the pipe axis instead of transversely thereof, in order to permit the unit to operate in smaller diameter pipes. While this device also is diametrically adjustable, this is accomplished by a reciprocal fluid motor and toggle assembly supporting a wheel, with the extent of such adjustment being limited for facilitating entry of the vehicle into a pipe.

While the following patents are of interest because they disclose various usages of sled type transporting device generally, the same are not analogous to the inventive field of conduit inspection. Kirk, U.S. Pat. No. 2,299,993, merely discloses a ski stretcher with collapsible legs. Robinson, U.S. Pat. No. 2,394,264 teaches a combined stretcher and fracture board on skids. Murray, U.S. Pat. No. 2,725,239 discloses a combined toboggan and sled type mobile container with retractible and extensible runners movable by manual operation of a lever and linkage. Finally, Cawl, U.S. Pat. No. 2,612,380 is merely directed to a vacuum cleaner runner assembly.

Another problem occurs when the sled runs into a blank wall during conduit inspection and can not be pulled through the outlet manhole. It then becomes necessary to reverse the direction of sled movement by pulling on the previously slack rear cable and leaving the front cable slack. The difficulty here is that if the sled already has passed by an obstruction, it may not be able to do so in the reverse direction for a number of reasons, such as the angle at which the obstruction projects or change in orientation of the sled. None of the prior art devices referred to above is seen to offer a simple and effective solution to this problem either.

SUMMARY OF THE INVENTION

Accordingly, the primary objects of the present invention are to provide a new and improved conduit inspection sled which is so constructed and designed as to overcome the various deficiencies of the aforesaid prior art devices. To these ends, the inventive sled is especially adapted to transport a television camera or the like substantially along the center line of a conduit for substantially accurate and uninterrupted inspection thereof, by automatically conforming to the conduit interior notwithstanding size variation thereof, while simultaneously clearing obstructions therein, as well as being readily collapsible to and automatically locked in a fully retracted position for facilitating retrieval of such sled by reverse travel past obstructions already cleared.

Thus, the inventive conduit inspection sled includes cage means for carrying a camera or the like, peripherally spaced upper and lower support means mounted on the upper and lower sides respectively of the cage means, and cable means connected to the sled for transporting the same along the conduit, wherein the improvement comprises: link means pivotally connecting the cage means and lower support means for relative movement toward and away from each other into retracted and extended sled positions respectively; and resilient means connecting and normally biasing the cage means and lower support means into the extended sled position, wherein the lower support means movably contact the inner periphery of the conduit and thereby normally center the camera or the like substantially along the central longitudinal axis of the conduit; such resilient means also permitting such relative movement into such retracted sled position, wherein the sled is allowed to clear an obstacle in the conduit.

Such inventive sled also includes stop means on one of such cage means and lower support means; such stop means being engageable with stop retainer means on the other of such cage means and lower support means, for limiting such relative movement to such extended position; such stop means also being adjustable and removably engageable with such stop retainer means on the other of such cage means and lower support means in more than one such extended position, depending upon the interior size of the conduit.

Such inventive sled also includes latch means on one of such cage means and link means removably engageable with keeper means on the other of such cage means and link means for locking such sled in a fully retracted position; such cable means including a cable connected to and extending in one direction from such lower support means and a cable connected to and extending in the opposite direction from such cage means, whereby pulling on one of such cables while tensioning the other of such cables collapses such sled into such fully retracted position, in order to facilitate retrieval of such sled by reversely transporting the same past an obstruction already cleared; such latch means also being adjustable for ensuring positive engagement with such keeper means.

Additional objects and advantages of the invention will become apparent upon consideration of the following detailed description and the accompanying drawings, wherein:

BRIEF DESCRIPTION OF THE DRAWINGS

FIG. 1 is a side elevation of a conduit inspection sled constituting a preferred embodiment of the invention, the sled being shown within a conduit represented by dotted lines, and as carrying a television camera also represented by dotted lines;

FIG. 2a is an enlarged fragmentary section taken substantially along line 2a—2a of FIG. 1, and illustrating details of the stop device adjustably engaged with the stop retainer device for limiting the extended position of the sled in conformity with the interior of a large conduit, such as one having an internal diameter (I.D.) of say 12 inches;

FIG. 2b is a view similar to FIG. 2a, but showing the stop device adjusted for a smaller conduit of say 10 inches I.D.;

FIG. 2c is a view similar to FIGS. 2a and 2b, but illustrating the stop device adjusted for a still smaller pipe of say 8 inches I.D.;

FIG. 3 is a further enlarged fragmentary cross-section taken substantially along line 3—3 of FIG. 2a, and showing details of the stop and retainer devices;

DETAILED DESCRIPTION OF THE PREFERRED EMBODIMENT

General Description

Figure 4:
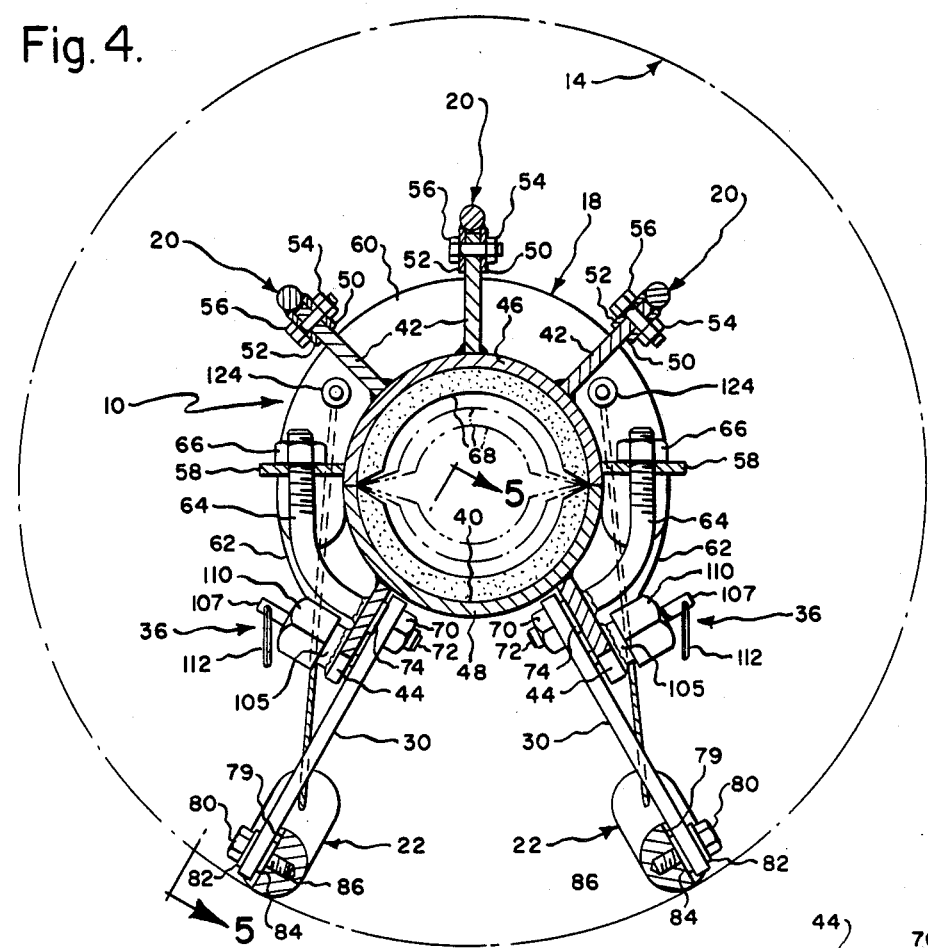
FIG. 4 is an enlarged cross-section taken substantially along line 4—4 of FIG. 1, and illustrating structural details of the following components: camera carrying cage, upper struts and skids thereon, lower struts, and runners pivotally connected thereto by links.

Referring to the drawings, and particularly FIGS. 1 and 4, a conduit inspection sled constituting a preferred embodiment of the invention is generally indicated at 10, and as carrying a closed circuit television camera or like device schematically indicated at 12. The various cable and other components of the closed circuit television system, as well as the detailed construction of the camera are conventional, and therefore are not shown, for clarity of illustration. Likewise, inventive sled 10 is shown as being located within a conduit, such as an underground sewer pipe or line, schematically illustrated at 14, and provided with an internally projecting obstruction, such as a house lateral or the like, schematically shown at 16. Typically, conduit 14 is illustrated as being of elongated cylindrical configuration and of right circular cross-section, with camera 12 being of like configuration and cross-section. However, such configuration and cross-section can vary.

In fact, sled 10 is shown just prior to engaging such obstruction 16, and as will be demonstrated below, is so constructed and designed as to automatically retract diametrically or laterally, in order to clear such obstruction as the sled is being transported, such as forwardly in the direction of the arrow A. As also seen in FIG. 4, sled 10 is in a normal fully extended position, with sliding contact being made along the bottom or lower inner periphery of the pipe or conduit 14, in order to locate the camera lens substantially along the center line or central longitudinal axis of the conduit, for accurate viewing therein.

Returning to FIG. 1 in particular, inventive sled 10 generally includes a cage 18 for carrying camera 12, three peripherally (e.g. circumferentially) spaced upper supports in the form of elongated skids 20 having downturned ends 21 to facilitate transport and obstacle clearance, and two like spaced lower supports in the form of elongated runners 22 having upturned front and rear ends 23, 23a for facilitating transport and obstacle clearance. Skids 20 and runners 22 are located respectively on the opposite upper and lower sides of cage 18 for transport along conduit 14 forwardly by front cable 24 and rearwardly by rear cable 26, with each of lower support runners 22 being pivotally connected to cage 18 by a fore link 28 and an aft link 30. These links permit the desired relative movement between cage 18 and support runners 22 toward each other to any number of retracted positions, such as the fully retracted position shown in FIG. 6, as well as away from each other to a plurality of extended positions, such as those shown in FIGS. 2a, b and c, depending upon the size of the interior of the conduit being inspected.

Continuing with FIG. 1, sled 10 also includes resilient means, preferably in the form of two tension springs 32 (only one being shown) connecting cage 18 to lower support runners 22 forwardly of such cage. Thus, springs 32 normally bias sled 10 into the desired extended position, while permitting such sled to be retracted to the desired retracted position for clearing obstacles during transport, as well as to be collapsed into the fully retracted position of FIG. 6. Sled 10 also includes two adjustable stop and stop retainer mechanisms (one on each side, with only one being shown) generally indicated at 34, and each of which limits the extension of such sled so that the same may automatically conform to the interior of the conduit, the adjustability of the stop mechanisms controlling such extension, depending upon the interior size of the conduit, as will be explained in greated detail below. Finally, sled 10 is provided with two latch and keeper mechanisms generally indicated at 36, for automatically locking sled 10 in the fully retracted position of FIG. 6, and thereby facilitating retrieval of the sled by reverse transport through the conduit, as also will be discussed in greater detail below.

Cage

More specifically, cage 18 includes longitudinally spaced front and rear collars 38, 40 of suitable configuration and crosssection for carrying camera 12, e.g. the cylindrical configuration and right circular crosssection being illustrated. These collars are connected by three upper elongated struts 42 which extend radially outwardly from the upper side of such collars, and two lower elongated struts 44 which extend radially outwardly from the underside of such collars. As shown in FIG. 4, struts 42 and 44 are secured in place by any suitable means such as welding.

Continuing with FIG. 4, collars 38 and 40 are split into upper and lower halves 46, 48, the former being provided with the circumferentially spaced upper struts 42 on which are secured elongated skids 20 welded onto flanges 50, 52 telescoping over the upper ends of struts 42 and removably secured in place by nuts 54 on through studs 56.

Each upper collar half 46 also is provided on each side with generally radially outwardly extending flanges 58, such flanges being of generally L-shaped configuration as best seen in FIG. 1, the lower horizontal legs of which terminate forwardly and rearwardly at radially outstanding and circumferentially extending, reinforcing yokes 60, the lower ends of which extend below the lower edges of upper collar half 46.

Likewise, lower collar half 48 is provided with complementary yokes 62 contacting and overlapping yokes 60 to facilitate alining of the upper and lower collar halves for assembly purposes, such assembly being completed by upstanding bolts 64 welded at their inturned lower ends to the upper inclined surfaces of lower struts 44 and passing upwardly through flanges 58 for removable securement by nuts 66. Thus, the opposite ends of camera 12 are removably secured in place. As best seen in FIG. 4, the interior surfaces of both collar halves are provided with a cushioning layer 68 which may vary in thickness, as shown by dotted lines, depending upon the cross-sectional size of the camera. The upper outer surfaces of struts 64 also are provided at their rear ends with the latch components of the latch and keeper mechanisms 36 to be described in greater detail below.

Pivotal Link Structure Connecting Cage and Runners

Continuing with FIGS. 1 and 4, fore and aft links 28 and 30 are pivotally mounted at their upper ends to the front and rear ends respectively of each of struts 44 by nuts 70 threadedly engaging studs 72 passing through both the struts and the links, with pivotal movement being enhanced by spacer washers 74 arranged between the links and the struts.

Figure 6:
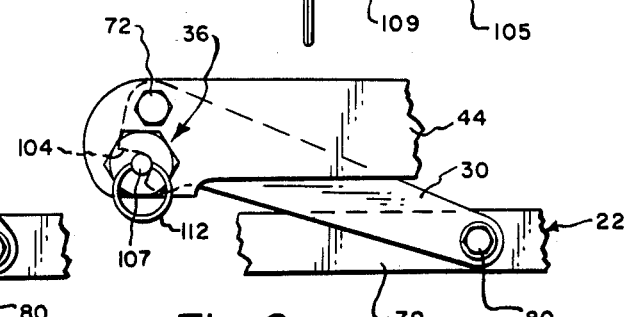
FIG. 6 is a view similar to FIG. 5, but illustrating the engaged latch and keeper mechanism locking the inventive embodiment in the fully retracted position.

As best shown in FIG. 1, each strut 44 is provided intermediate its ends with an enlarged downwardly open cutout 76 to facilitate complete collapse of sled 10 when located in the fully locked position of FIG. 6, thereby permitting struts 44 to clear the lower rear pivotal connections with runners 22, which are provided intermediate their front and rear ends with elongated flats 78, 79 respectively, to facilitate such pivotal movement of links 28, 30. The lower pivotal connections are made by studs 80 passing through the lower ends of the links into blind bores 86 in runners 22, with pivotal movement being enhanced by spacer washers 82, 84 between the studs and the links, as well as the links and runner flats 78, 79, as best seen in FIG. 4.

As will be evident from FIGS. 1, 2a, b, c and 6, such upper and lower pivotal mountings of links 28, 30 provide the desired relative movement of cage 18 and lower support runners 22 toward and away from each other into the desired retracted and extended positions, respectively.

Resilient Means

The resilient means for permitting such relative movement of cage 18 and runners 22 toward each other for collapsing the sled 10 into the desired retracted positions, as noted above, preferably take the form of two tension springs 32 (only one being shown), which have their upper ends hooked around lower yoke 62 and their lower ends hooked through eyelets 87 on the upper surfaces of the upturned front ends 23 of runners 22. As illustrated in FIG. 1, springs 32 are inclined slightly downwardly and forwardly from the lower side of cage 18, with the points of attachment to runners 22 being substantially forwardly of the cage. Thus, as sled 10 is being transported forwardly in the direction of arrow A by front cable 24, and makes contact with an obstruction such as house lateral 16 by engagement therewith of a downturned end 21 of one or more upper skids 20, springs 32 permit cage 18 to move rearwardly and downwardly relative to runners 22 to the desired retracted position for clearing such obstacle. On the other hand, relaxation of the tension on springs 32 will automatically return sled 10 to the extended position, wherein the lens of camera 12 will be re-centered substantially along the central longitudinal axis of the conduit for accurate viewing.

Adjustable Stop Means and Stop Retainer Means

In order to limit the relative movement between cage 18 and runners 22 so that camera 12 is centered along conduit 14, sled 10 is provided, preferably on each lower side, with a stop and retainer mechanism generally indicated at 34 in FIGS. 1, 2a, b, c and 3 (only one being shown). Each stop and retainer mechanism includes an adjustable stop device generally indicated at 88 and a stop retainer device generally indicated at 89. The stop device is in the form of an elongated flexible member, such as an upwardly extending wire rope or cable 90, which is provided at each end with an enlarged retaining terminal or like abutment 91. At its lower end, rope 90 is provided with an anchoring salient preferably in the form of a hollow cylindrical slug 92 preferably suitably clinched in place adjacent lower knob 91 and seated in an enlarged bore 93 of complementary shape provided in each runner 22 intermediate flats 78, 79, and which bore connects to a through hole 94 for passage of rope 90. At predetermined intervals along its length, rope 90 also is provided with a series of longitudinally spaced salients 95a, b and c, alike in all respects to lowermost salient 92, with slug 95a clinched adjacent upper terminal 91, and with slug 95b clinched between slugs 95a and 95c.

Retainer device 89 includes an outstanding lug 96 suitably fixed on the outer surface of each adjacent lower strut 44 intermediate fore and aft links 28, 30, such as by welding 97, and provided with an outwardly open through slot 98, as well as a through hole 99 outboard of and extending transversely across the slot. A locking pin 100, preferably in the form of a spring wire cotter pin, completes retainer device 89, and this pin includes a straight section 101 slidably receivable in and passable through opening 99, as well as an undulating reentrant section 102 engagable over lug 96.

Thus, should the more extended sled position shown in FIGS. 1 and 2a be desired, for use in a large conduit, such as one of 12 inches I.D., it is but a simple matter to selectively engage the lower or under side of salient 95a with the upper side of lug 96, inasmuch as rope 90 is freely slidable into the outwardly open end of slot 98. Whereupon, straight section 101 of pin 100 is slid through opening 99 to span slot 98 outboard of rope 90, and reentrant pin section 102 is sprung into engagement over the outer end of lug 96, thereby removably retaining rope 90 in place and limiting relative movement of cage 18 and support runners 22 to the more extended position shown in FIGS. 1 and 2a, wherein the lens of camera 12 is centered along conduit 14. On the other hand, should it be necessary or desirable to limit the extended sled position in order to conform to smaller conduits, such as those of 10 inches I.D. and/or 8 inches I.D., then the above procedure is repeated for selectively engaging slug 95b with lug 96 for a 10″ I.D. pipe, as shown in FIG. 2b, or slug 95c with lug 96 for an 8″ I.D. pipe, as shown in FIG. 2c.

It is to be understood that the 8″, 10″ and 12″ positions of stop and retainer mechanisms 34 are the most widely used conduit sizes, particularly when inspecting sewer pipes or lines. However, it should be evident that additional sizes could be accomodated, including those larger than 12″ I.D. and those smaller than 8″ I.D.

Latch and Keeper Mechanism

Figure 7:
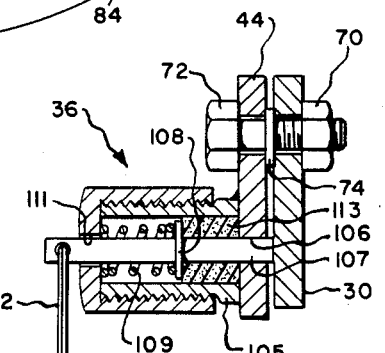
FIG. 7 is a further enlarged fragmentary section taken substantially along line 7—7 of FIG. 5, and showing the detailed structure for adjusting the latch.
Figure 5:
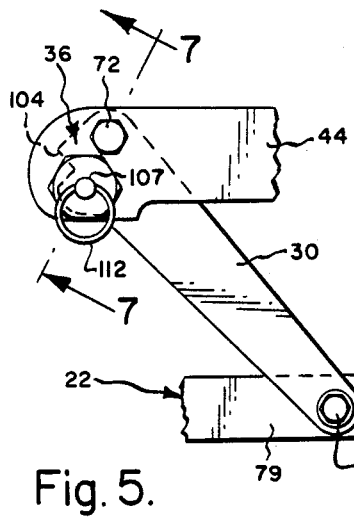
FIG. 5 is a fragmentary section taken substantially along line 5—5 of FIG. 4, and showing structural details of the disengaged latch and keeper mechanism in the extended position of the inventive embodiment, as also shown in FIG. 1.

Referring now to FIGS. 5-7 in particular, sled 10 also is provided, preferably on each side, with a latch and keeper mechanism generally indicated at 36 for automatically locking sled 10 in the fully retracted position of FIG. 6, in order to facilitate retrieval of the sled by reverse or rear transport via rear cable 26, especially in situations where, after traversing a length of conduit, sled 10 confronts a blank wall, preventing turning and removal of the sled upwardly through an outlet manhole (not shown). Thus, by such automatic locking in the fully retracted position, it is but a simple matter to reversely or rearwardly transport the sled freely past obstacles already cleared, and remove the sled by pulling upwardly through the inlet manhole (not shown).

Moreover, while it may be possible to remove sled 10 from a conduit by transporting reversely, as by merely pulling on cable 26, this movement would be considerably slowed by the necessity of the sled to retract or contract against the bias of tension springs 32 for each obstacle. Furthermore, in some instances, an obstacle, which may be readily cleared in forward transport, such as the forwardly skewed or inclined house lateral 16, may not be so readily cleared in rearward transport, because the inclined surface 16a could have a tendency to cam the rear ends of skids 20 upwardly instead downwardly, and thereby interfere with retraction of the sled. Hence, latch and keeper mechanism 36 is designed to overcome this problem as well, by automatically locking sled 10 in the fully retracted position free of previously cleared obstacles, for uninterrupted rear transport.

As shown in FIGS. 5-7, each mechanism 36 includes a keeper preferably in the form of a notch 104 on the trailing edge of each aft link 30, together with a latch composed of the following elements, best shown in FIG. 7. An externally threaded and hollow, cylindrical housing 105 is suitably welded in place on the outer surface of the rear end of each strut 44 to project laterally outwardly therefrom, and each strut is provided with a through hole 106 communicating with the interior of housing 105. Reciprocally mounted within the housing is a plunger 107 having an enlarged annular flange 108 inset from its outer end and engaging one end of a compression spring 109 surrounding the plunger, the other end of which spring suitably engages the inside of the base of a cap 110, which is internally threaded to engage the external threads on cylindrical housing 105, and provided with a hole 111 through its base for free passage of the outer end of plunger 107 which is perforated to receive a handle in the form of a helically split ring 112. Thus, as shown in FIGS. 5 and 7, the inner end of plunger 107 is spring biased into sliding engagement with the outer surface of the upper end of each aft link 30 until sled 10 is collapsed into the fully retracted position of FIG. 6, whereupon the inner end of plunger 107 is biased through hole 106 and into positive engagement with notch 104 (FIG. 6), thereby automatically locking sled 10 in such fully retracted position to facilitate its retrieval, as noted above. Of course, it is but a simple matter for the operator to manually pull out handle 112 of plunger 107 sufficiently to disengage the plunger from notch 104, and the seld automatically will expand or enlarge into the desired extended position, by virtue of the bias of tension springs 32.

In order to ensure positive engagement between plunger 107 and notch 104, the latch is adjustable by virture of the threaded engagement between cap 110 and housing 105 to vary the bias of compression spring 109, and a packing gland 113 or the like may be located around plunger 107 inboard of flange 109 for lubrication purposes.

Returning to FIGS. 1 and 4 in particular, sled 10 is completed by the front and rear cables 24, 26 noted above. Front cable 24 is provided with a Y-connection 114 including legs 116 (only one being shown), each leg and the cable being provided with enlarged terminals 118 for suitable engagement in slots provided in the upturned front ends 23 of each runner 22 and in the Y-connection 114. Likewise, rear cable 26 is provided with a slotted Y-connection 120 including legs 122 which pass through slots in the upturned rear ends 23a of runners 22 and then through rear yoke 60 on each side of cage 18, such cable and legs being provided with enlarged terminals 124 for suitably retaining such legs in place.

This particular construction of cables 24, 26 and their attachment to sled 10 not only facilitates proper transport in opposite directions through conduit 14, but also facilitates collapse of sled 10 into the fully retracted position. This is accomplished by pulling on normally slack rear cable 26 and merely placing tension on front cable 24, thereby exerting a rearward and downward force on cage 18 for collapsing sled 10 by virtue of the relative movement between the cage and runners 22, causing links 28, 30 to pivot rearwardly and downwardly in the direction of such pull, until the sled is automatically locked in the fully retracted position of FIG. 6, and thereby facilitate retrieval of the sled by reverse or rearward transport thereof.

It will now be seen how the invention accomplishes its various objectives, and likewise numerous advantages of the invention will be evident. While the invention has been described and illustrated herein by reference to a single preferred embodiment, it is to be understood that this is to be considered as illustrative of, rather than as limiting the invention, the scope of which is to be determined by the appended claims.

What is claimed is:

1. A conduit inspection sled including cage means for carrying a camera or the like, peripherally spaced upper and lower support means mounted on the upper and lower sides respectively of said cage means, and cable means connected to said sled for transporting the same along the conduit, wherein the improvement comprises: link means pivotally connecting said cage means and lower support means for relative movement toward and away from each other into retracted and extended sled positions respectively; and resilient means connecting and normally biasing said cage means and lower support means into said extended sled position, wherein said lower support means movably contact the inner periphery of the conduit and thereby normally center the camera or the like substantially along the central longitudinal axis of the conduit; said resilient means also permitting said relative movement into said retracted sled position, wherein the sled is allowed to clear an obstacle within the conduit; one of said cage means and lower support means being provided with stop means engageable with retainer means on the other of said cage means and lower support means, for limiting said relative movement to said extended position; one of said cage means and link means being provided with latch means removably engagable with keeper means on the other of said cage means and link means for locking said sled in fully retracted position; and said cable means including a cable connected to and extending in one direction from said lower support means, and a cable connected to and extending in the opposite direction from said cage means, whereby pulling on one of said cables while tensioning the other of said cables collapses said sled into said fully retracted position, in order to facilitate retrieval of said sled by reversely transporting the same past an obstruction already cleared.

2. A conduit inspection sled according to claim 1, wherein said stop means is adjustable and removably engageable with said stop retainer means on the other of said cage means and lower support means in more than one said extended position, depending upon the interior size of the conduit.

3. A conduit inspection sled according to claim 1, wherein said latch means is adjustable for ensuring positive engagement with said keeper means.

4. A conduit inspection sled according to claim 1, wherein said cape means include longitudinally spaced adjustable collars for removably clamping the camera or the like therein, and peripherally spaced and outwardly extending, elongated upper and lower struts connecting the upper and lower sides respectively of said collars; said lower support means include elongated runners arranged below said lower struts, and elongated skids mounted on said upper struts; said link means include fore and aft links pivotally connecting the front and rear ends respectively of said runners and lower struts; said resilient means include tension spring means connecting said cage means with said runners forwardly of said cage means; one of said runners is provided with stop means engagable with stop retainer means on the adjacent one of said lower struts, for limiting said relative movement to said extended sled position; one of said lower struts is provided with latch means removably engagable with keeper means on one of said fore and aft links for locking said sled in fully retracted position; and said cable means include a front cable connected to and extending forwardly from said runners for transporting said sled forwardly along the conduit, and a rear cable connected to and extending rearwardly from said cage means for transporting said sled rearwardly along the conduit, whereby pulling on said rear cable while tensioning said front cable collapses said sled into said fully retracted position, in order to facilitate retrieval of said sled by rearwardly transporting the same past an obstacle already cleared during forward transport.

5. A conduit inspection sled according to claim 4, wherein said stop means is adjustable and removably engageable with said stop retainer means in more than one said extended sled position depending upon the interior size of the conduit.

6. A conduit inspection sled according to claim 5 wherein said adjustable stop means includes an elongated flexible member anchored in said runner and provided with longitudinally spaced salients; said stop retainer means includes an outstanding lug fixed on said lower strut and selectively engagable with each of said salients, and a locking pin, said lug having an outwardly open through slot slidably receiving said elongated member and a through opening extending transversely of said slot and slidably receiving said pin, which spans said slot and is provided with means engagable with said lug, for removably retaining said elongated member in said slot.

7. A conduit inspection sled according to claim 4, wherein said latch means is adjustable for ensuring positive engagement with said keeper means.

8. A conduit inspection sled according to claim 7, wherein said keeper means includes a notch in the trailing edge of said aft link; and said latch means includes an externally threaded housing on the rear end of said lower strut, which has a through opening to said housing and aft link, a plunger movable in said housing, a compression spring biasing one end of said plunger through said opening into sliding contact with said aft link during said relative movement and into removable engagement with said notch in said fully retracted position, and an internally threaded cap engagable with said housing and compression spring, for varying the bias of said compression spring, and having a through opening for passage of the other end of said plunger, which is provided with a handle for disengaging said one end of said plunger from said notch against the bias of said compression spring.

* * * * *